United States Patent [19]
Wöhler et al.

[11] Patent Number: 5,470,049
[45] Date of Patent: Nov. 28, 1995

[54] BEARING FOR A SPRING STRUT OF A MOTOR VEHICLE

[75] Inventors: Hans J. Wöhler, Stuttgart; Francesco Germano, Sachsenheim, both of Germany

[73] Assignee: Dr. Ing. h.c.F. Porsche AG, Weissach, Germany

[21] Appl. No.: 36,892

[22] Filed: Mar. 25, 1993

[30] Foreign Application Priority Data

Apr. 3, 1992 [DE] Germany .................. 42 11 176.5

[51] Int. Cl.⁶ ............................................. F16F 1/12
[52] U.S. Cl. ..................... 267/172; 267/170; 267/179; 267/286
[58] Field of Search ...................... 267/202–207, 267/214, 216, 220, 221, 224, 166, 170, 172, 175, 177–179, 286; 248/578, 624; 403/13, 14

[56] References Cited

U.S. PATENT DOCUMENTS

| 4,162,064 | 7/1979 | Bouton et al. ............... 267/177 |
| 4,458,605 | 7/1984 | Herring, Jr. et al. ........... 267/175 |
| 4,527,782 | 7/1985 | Klann ......................... 267/177 |
| 4,606,442 | 8/1986 | Paton et al. ................. 267/216 |
| 4,779,850 | 10/1988 | Paton et al. ................. 267/33 |
| 4,993,376 | 2/1991 | Fukutome et al. ............ 267/166 |
| 5,246,215 | 9/1993 | Takamura et al. ............ 267/179 |
| 5,249,781 | 10/1993 | Wohler ...................... 267/170 |

FOREIGN PATENT DOCUMENTS

| 0480443 | 4/1992 | European Pat. Off. ............ 267/220 |
| 2637338 | 4/1990 | France . |
| 1199634 | 1/1962 | Germany . |
| 3620774A1 | 1/1987 | Germany . |
| 2026131 | 1/1980 | United Kingdom . |

OTHER PUBLICATIONS

European Search Report No. EP 93 10 3536.
Revue Technique Automobile, Bd. 31, Nr. 352, Jan. 1976, Boulogne-Billancourt FR, Seite 199, 'Etude Peugeot 504', Abbildung Rechtsoben.AR.
Revue Technique Automobile, Bd. 33, Nr. 374, Jan. 1978, Boulogne-Billancourt FR Seiten 47—52 'Etude Lancia Beta', Seite 52, Abbildung 21.

*Primary Examiner*—Robert J. Oberleitner
*Assistant Examiner*—Chris Schwartz
*Attorney, Agent, or Firm*—Evenson McKeown Edwards & Lenahan

[57] ABSTRACT

A bearing assembly is disclosed for supporting a coil spring, for example for an automobile suspension system. The bearing assembly includes an elastic support having a sloped spring supporting surface corresponding to the pitch of the spring. At the side opposite the spring, the elastic support is supported by a distance element. The distance element and elastic support are geometrically configured so that a uniform axial length of the elastic support member is disposed between the spring and the distance element over a substantial circumference of the coil spring. In certain embodiments, recesses are formed in the elastic support member for engaging with cams at the distance element, with the ends of the cams and the bottoms of the recesses dimensioned so that there is a constant height of the elastic support between the spring and the distance element. In other embodiments, continuous sloped surfaces are provided in both the distance element and the elastic support, again with a constant axial length of elastic support over a substantial portion of the circumference of the coil spring.

18 Claims, 6 Drawing Sheets

1

BEARING FOR A SPRING STRUT OF A MOTOR VEHICLE

BACKGROUND AND SUMMARY OF THE INVENTION

The present invention relates to a bearing for a spring strut of a motor vehicle on the vehicle body by way of a spring plate which holds an elastic support and on which a coil spring is supported.

German Patent Document DE-36 20 774 A1 shows a spring strut wherein a coil spring is supported by means of a rubber-elastic receiving device on a spring plate held on the vehicle body side. The elasticities via the support differ because of the clearances to the spring plate, resulting in a tendency of the spring to dent.

It is an object of the invention to provide a bearing for a spring strut which provides an optimal guiding of the spring while the likelihood of denting is decreased.

According to the invention, this object is achieved by providing that an elastic support has a supporting surface that is adapted to the pitch of the spring, and the support is held by means of a distance element on a spring plate on the vehicle body side. The distance plate is developed such that, at least in the supporting area of the spring in the elastic support, an identical wall thickness and therefore an identical elasticity is formed. As a result, denting of the coil spring during the springing operation is largely avoided.

For this purpose, the elastic support has a supporting surface which is sloped in the direction of the longitudinal axis of the spring strut. Opposite this supporting surface is a parallel contact surface which is formed either of cams in the distance element or by a continuous surface of another construction of the distance element.

In each case, the distance element is constructed in such a manner that an identical elasticity develops in each case on the elastic support in the area of the support of the spring. The cams on the distance element contribute to the stiffness.

The spring supporting surface is set corresponding to the pitch of the spring coil so that the spring has no contacting spring walls in the end area. In contrast, the bearing surface of the distance element is aligned at a right angle with respect to the spring strut axis so that a wedge-shaped distance element and a wedge-shaped support are obtained.

The distance element having a rigid part and light plastic part may consist of a ring or may be interrupted in the area of a springy bridge member in the elastic support so that its spring action is not impaired. For the purpose of a height compensation, several distance elements may also be provided.

During a springing operation, the springy bridge member must ensure the contact of the spring coil on the spring support surface. In addition, the spring end is supported over an angle of approximately 270°.

When the distance element is developed as a disk with a continuous contact surface or bearing surface, the elastic support is constructed with a correspondingly continuous support bottom surface. In order to reduce weight, the distance element may be constructed with circularly extending grooves in one of the surfaces, which may also take place in the case of a distance element comprising cams.

Other objects, advantages and novel features of the present invention will become apparent from the following detailed description of the invention when considered in conjunction with the accompanying drawings.

DETAILED DESCRIPTION OF THE DRAWINGS

Figure 1:
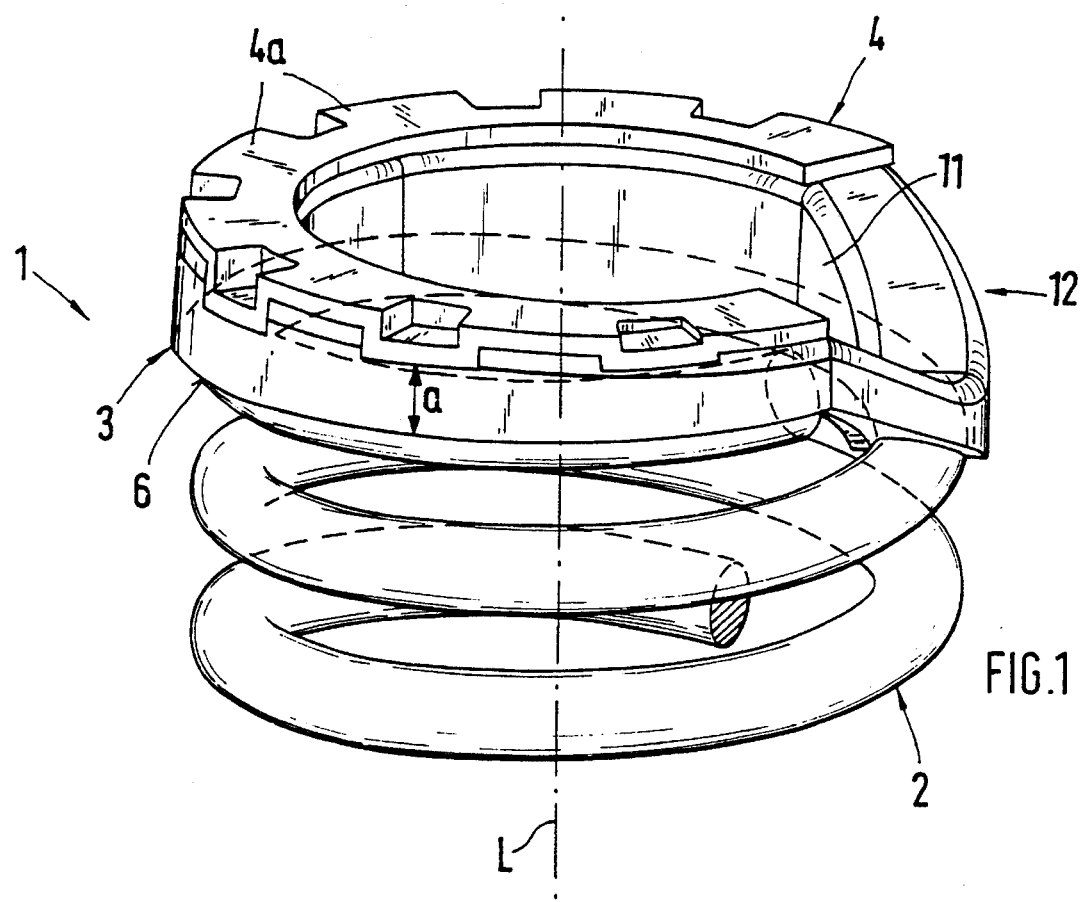
FIG. 1 is a diagrammatic representation of a spring unit which is composed of a spring of an elastic support and of a distance element according to an embodiment of the present invention.

A spring unit 1 comprises a spring strut (not shown) which is supported on the vehicle body and to which a flat coil spring is coaxially arranged. The flat coil spring is supported on a spring plate 5 via an elastic support 3 and an interposed distance element 4. The spring plate 5 is in turn, held on the vehicle body.

The elastic support 3 has a supporting surface 6 which is set obliquely corresponding to the coil pitch of the spring 2, the last spring coil being embedded into the supporting surface 6. Recesses 7 for the cams 8 of the distance element 4 are provided opposite the surface 6 which are fitted into the recesses 7. The surfaces 10 between the recesses 7 of the support which are situated opposite the supporting surface 6 are set at a right angle with respect to the spring strut axis L so that recesses 7 of different depths are obtained into which correspondingly high cams 8 project and brace the support 3.

The recesses 7 have support bottom surfaces 9 which extend in parallel to spring supporting surface 6. An identical thickness (d) is obtained between the surfaces 9 and the supporting surface 6 and, as a result, the elasticity in this area remains the same along the circumference of the support 3.

Figure 2:
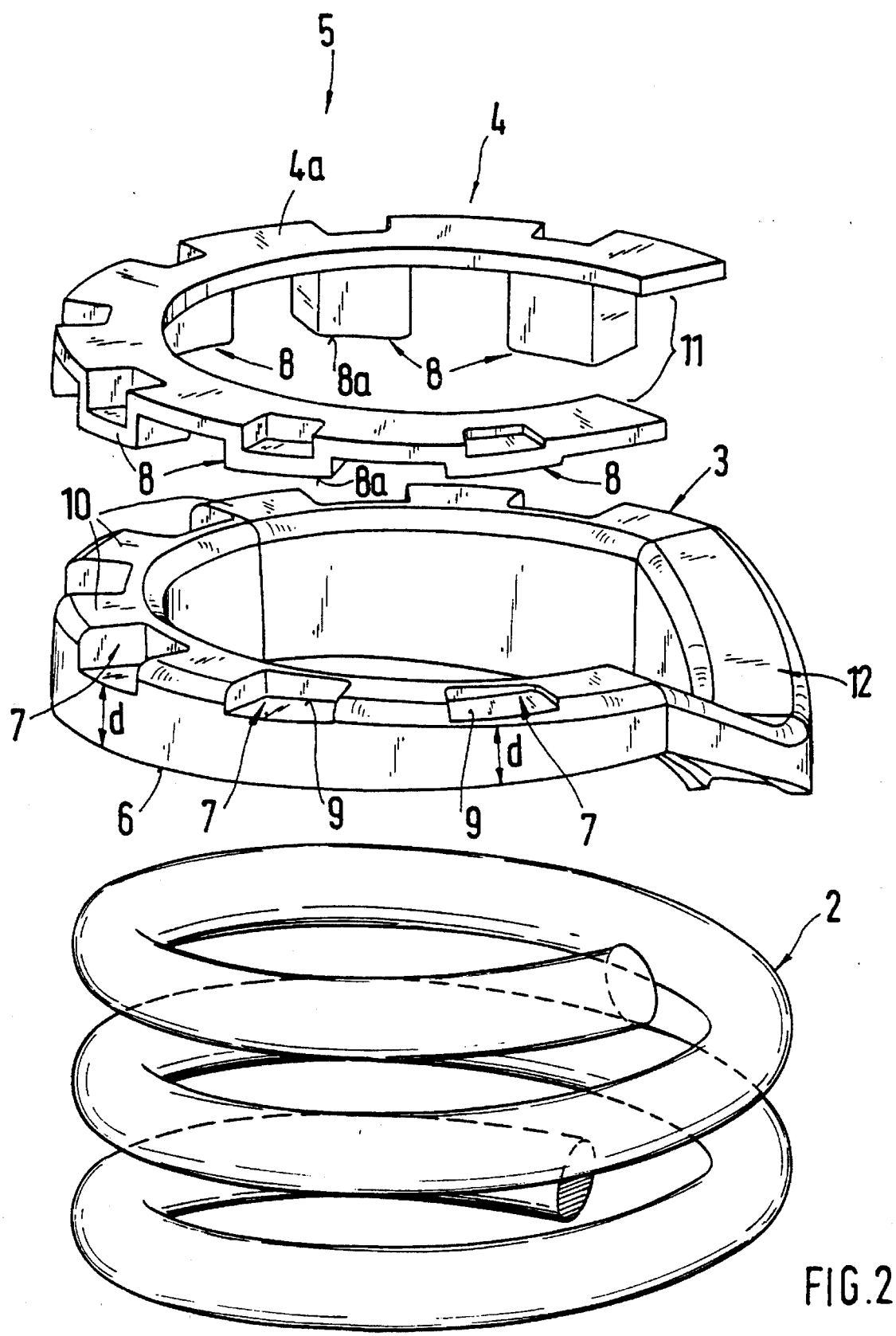
FIG. 2 is a diagrammatic representation of the component parts of the spring unit before an assembly according to an embodiment of the present invention.
Figure 3:
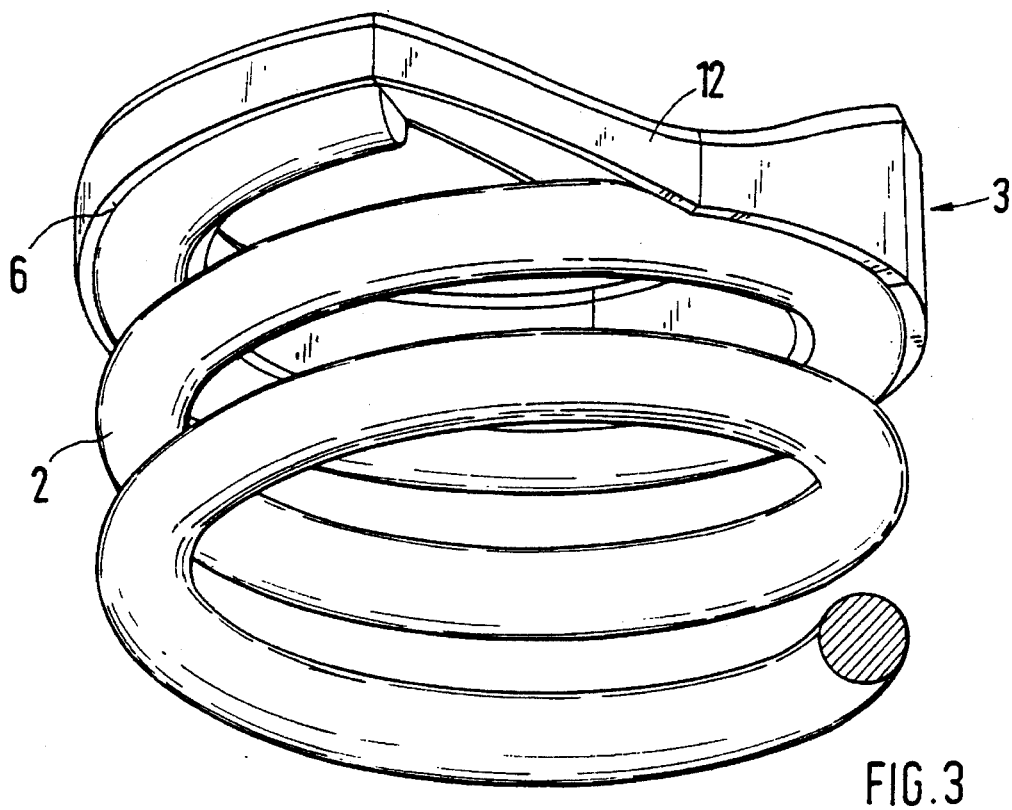
FIG. 3 is a representation of the spring supported on the elastic support, with the bridge member according to an embodiment of the present invention.
Figure 4:
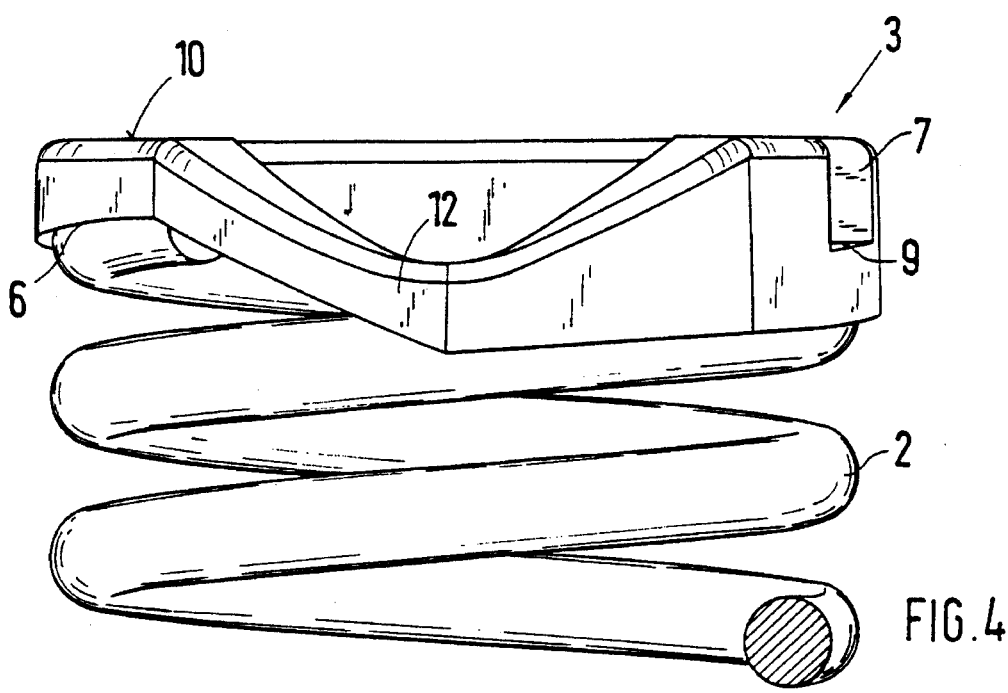
FIG. 4 is a view of the bridge member according to an embodiment of the present invention.
Figure 5:
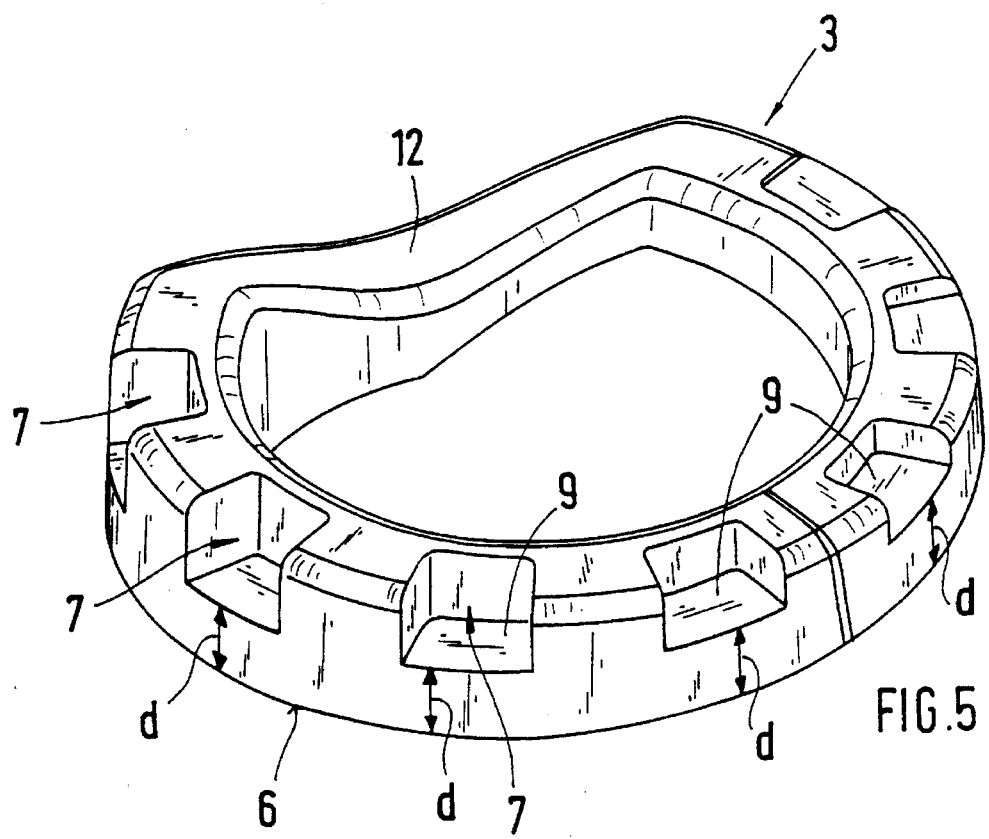
FIG. 5 is a top view of the elastic support with recesses for the cams of the distance element according to an embodiment of the present invention.
Figure 6:
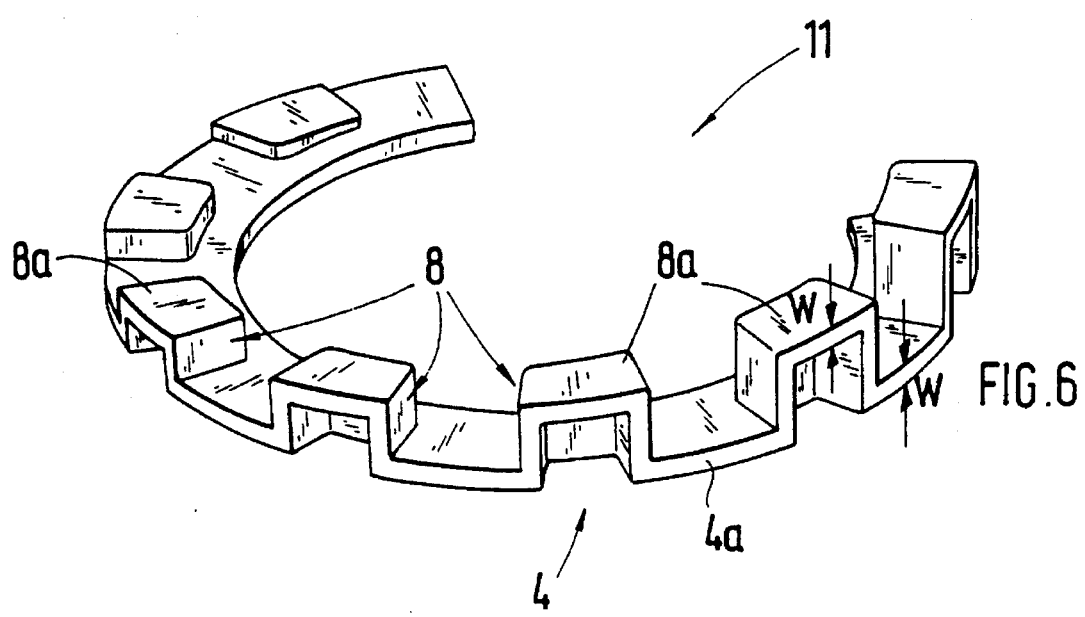
FIG. 6 is a top view of the distance element with the cams according to an embodiment of the present invention.

The distance element 4 has a flat surface 4a and consists of a rigid plastic part with a ring-shaped plate of the same wall thickness W, from which the cams 8 are shaped. The cams 8 have the same wall thickness as the plate. The element 4 may be constructed as a closed ring or FIGS. 1 and 2 as is provided in the area of the springy bridge member 12 on the support 3.

The bridge member 12 connects the spring supporting surface 6 in such a manner that the end coil of the spring 2 is in contact over an angular area of approximately 270°. In the case of springing operations, a contact on the bridge member 12 is also ensured.

Figure 7:
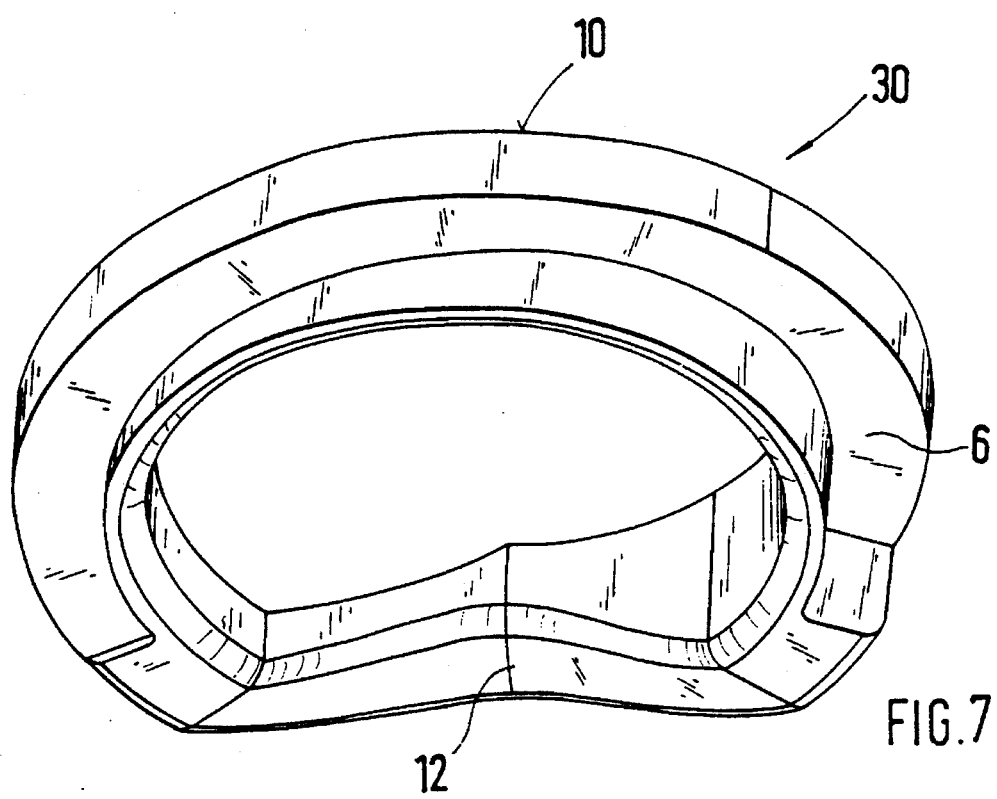
FIG. 7 is a view of the elastic support of the supporting surface facing the spring according to an embodiment of the present invention.
Figure 8:
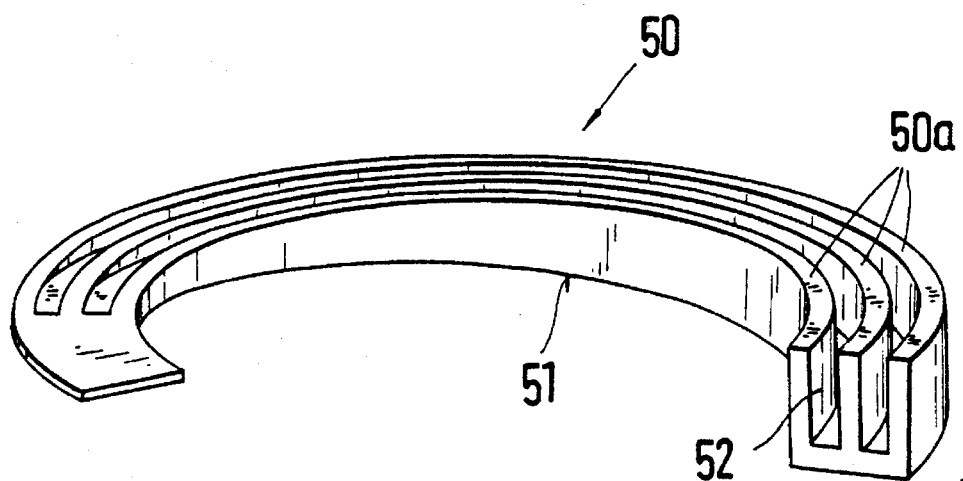
FIG. 8 is a view of another construction of a distance element with a flat contact surface and longitudinally extending grooves according to an embodiment of the present invention.

According to another embodiment of FIG. 8, the distance element may consist of a part 50 which comprises a wedge-shaped disk and has a continuous contact surface 51. The continuous supporting bottom surface 10 of the support 3 then also rests against this surface 51. Such a support 30 is illustrated in detail in FIG. 7. For reducing the weight, the distance element 50 is constructed with longitudinally extending grooves 52.

Figure 9:
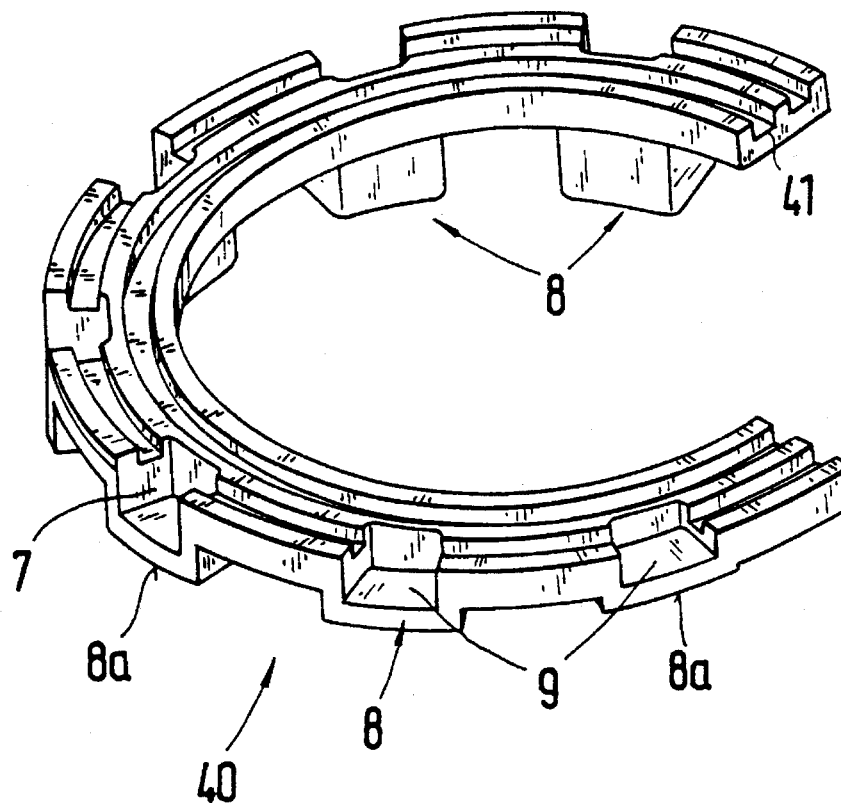
FIG. 9 is a view of another construction of a distance element with cams and longitudinally extending grooves of the bearing surface facing the spring plate according to an embodiment of the present invention.

The distance element 40 with the cams according to FIG. 9 may also be provided with longitudinally extending grooves 41.

The spring supporting surface 6 is sloped corresponding to the coil pitch of the spring 2 and is arranged at an angle with respect to the additional opposite surface 10, in which case this surface 10 extends in parallel to the spring plate 5. For achieving a uniform elasticity in the support 3, the distance element 4 is provided, which either has cams 8 or a continuous contact surface 51 (FIG. 8) to ensure an identical thickness of the support in the area of the spring support, whereby a tendency of the spring 2 to dent is suppressed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A bearing assembly for supporting a coil spring comprising:
    a wedge shaped elastic support with continuously increasing axial thickness over its circumferential direction corresponding to the pitch of said coil spring, said elastic support being engageable with said coil spring, and;
    a rigid wedge shaped distance element disposed on top of and mating with the elastic support and having a continuously increasing axial thickness corresponding to the pitch of said coil spring;
    wherein said elastic support and said distance element include mating spring supporting surface sections such that the top of the bearing assembly results in a flat supporting surface perpendicular to a longitudinal axis of the coil spring and said bearing assembly provides substantially uniform elasticity in a longitudinal axial direction over the circumference of the coil spring.

2. A bearing assembly according to claim 1, wherein said mating spring supporting surface sections are provided at respective cams of one of said elastic support and distance element and at respective recesses of the other of said elastic support and distance element, said mating spring supporting sections being formed by respective abuttingly engaged ends of said cams and recesses.

3. A bearing assembly according to claim 2, wherein said recesses are provided in the elastic support and the cams are provided on the distance element.

4. A bearing assembly according to claim 3, wherein said recesses have respective increasing axial dimensions in one circumferential direction which correspond to the pitch of said coil spring, and wherein said cams also have increasing axial dimensions in said one circumferential direction.

5. A bearing assembly according to claim 3, wherein the distance element is a rigid one-piece plastic part and comprises a plate-shaped portion with constant wall thickness, said cams being molded onto the plate-shaped portion and having a corresponding constant wall thickness.

6. A bearing assembly according to claim 4, wherein the distance element is a rigid one-piece plastic part and comprises a plate-shaped portion with constant wall thickness, said cams being molded onto the plate-shaped portion and having a corresponding constant wall thickness.

7. A bearing assembly according to claim 1, wherein the elastic support is an elastic support ring which includes a bridge section disposed in use adjacent an extreme end of the coil of the coil spring, said spring supporting surface sections of the elastic support extending over more than one half of the circumference of this ring.

8. A bearing assembly according to claim 7, wherein the distance element is a ring-shaped member which includes a clearance section in an area opposite the bridge section of the elastic support member when in an assembled in-use position.

9. A bearing assembly according to claim 8, wherein the bridge section is configured to operate in use as a dynamic contact of an end coil region on the spring supporting surface of the elastic support.

10. A bearing assembly according to claim 8, wherein the distance element is interrupted in the clearance section.

11. A bearing assembly according to claim 1, wherein the distance element is constructed as a closed ring.

12. A bearing assembly according to claim 1, wherein said mating spring supporting surface sections are provided as continuous contact surfaces on both the elastic support and the distance element, said continuous surfaces being inclined at an angle with respect to the longitudinal spring axis.

13. A bearing assembly according to claim 12, wherein the elastic support is an elastic support ring which includes a bridge section disposed in use adjacent an extreme end of the coil of the coil spring, said spring supporting surface sections of the elastic support extending over more than one half of the circumference of this ring.

14. A bearing assembly according to claim 13, wherein the distance element is a ring-shaped member which includes a clearance section in an area opposite the bridge section of the elastic support member when in an assembled in-use position.

15. A bearing assembly according to claim 13, wherein the bridge section is configured to operate in use as a dynamic contact of an end coil region on the spring supporting surface of the elastic support.

16. A bearing assembly according to claim 13, wherein the distance element is interrupted in the clearance section.

17. A bearing assembly according to claim 12, wherein grooves are arranged in the distance element which extend circumferentially about the longitudinal spring axis and serve to reduce the weight of the distance element.

18. A bearing assembly according to claim 12, wherein said distance element is a rigid one-piece plastic part.

* * * * *